Aug. 4, 1970    H. S. JONES    3,522,726
ELECTROMAGNETIC DEVICE
Filed Dec. 12, 1966

INVENTOR
HARRY S. JONES
BY
ATTORNEY.

United States Patent Office 3,522,726
Patented Aug. 4, 1970

3,522,726
ELECTROMAGNETIC DEVICE
Harry S. Jones, Hoboken, N.J.
(50 Navesink Drive, Monmouth Beach, N.J. 07750)
Continuation-in-part of application Ser. No. 393,434,
Aug. 31, 1964. This application Dec. 12, 1966, Ser.
No. 607,122
Int. Cl. G01l 3/26, 5/13; G01m 15/00
U.S. Cl. 73—117.4                                     5 Claims

ABSTRACT OF THE DISCLOSURE

This specification describes a device having means for producing a detached electromagnetic field, a current carrying conductor in the field, an alternating current passing through the conductor in synchronization with the alternating magnetic portion of the field and means for measuring the thrust imparted to the conductor by such operation and/or the deviation in the electromagnetic field caused by such operation. The measuring devices are per se of the known variety.

---

This application is a continuation-in-part of application Ser. No. 393,434, filed Aug. 31, 1964 now abandoned.

This invention relates to a novel electromagnetic device. It more particularly refers to such device adapted to test the interaction of the forces produced. It further envisions the use of this testing means in a slightly modified form as a thrust producing device.

It is well known that both the chemical and the ion type rocket motors used in space vehicles produce drive thrust by ejecting mass at high velocities relative to the space vehicle. Since such mass is never returned to the space vehicle it is necessary to carry very large amounts of material to produce sustained thrust. Furthermore, much thrust is wasted by having to accelerate mass which ultimately will be ejected to produce thrust.

This invention reveals a new means for obtaining thrust without the ejection of mass and utilizes a detached alternating electromagnetic field to produce a force upon an electrical conductor carrying electric current. Since the electrical conductor is attached to the space vehicle the force of interaction between the current-carrying conductor and the alternating electromagnetic field is exerted upon the space vehicle as a drive thrust. Since the detached electromagnetic field used to obtain interaction is maintained within the medium generally referred to as the "ether" no conventional Newtonian reaction is produced upon the space vehicle to cancel the thrust obtained by the interaction.

It is not feasible to utilize a steady-state or static magnetic or electric field for the above described purpose since a cancelling Newtonian reaction will be produced upon the poles of an electromagnet, a permanent magnet or permanent electret, or the electrodes used to produce a constant electric field. Such fields are not detached from the physical structures which produce them.

It has been known since the days of Hertz that an alternating electromagnetic field in free space becomes detached from its radiating source in the order of a wavelength from the source and then continues through space at the speed of light. It will be clear that any interaction between an electromagnetic wave and a current-carrying conductor will produce negligible reaction upon the wave source when the region of such interaction is one or more wavelengths from the source of the wave. This invention, therefore, makes use of this condition by utilizing such a detached alternating electromagnetic wave as a means for obtaining a force interaction between a current-carrying conductor and an electromagnetic field without a cancelling reaction upon the field-generating structure carried by the space vehicle.

In the drawings which form a part hereof like reference characters indicate corresponding parts in all figures. Parts having the same function herein as in my co-pending patent applications, Ser. No. 376,426 filed June 19, 1964 and now abandoned, and Ser. No. 381,782 filed July 10, 1964 and now abandoned, are given the same reference characters as in these co-pending patent applications. In all figures the printed page is used as a reference plane and parts and functions which occur above or below that plane and which can easily be visualized by those familiar with present electromagnetic wave concepts are described relative to that plane. All figures are combination sectional schematic diagrams and schematic block diagrams.

Figure 1:
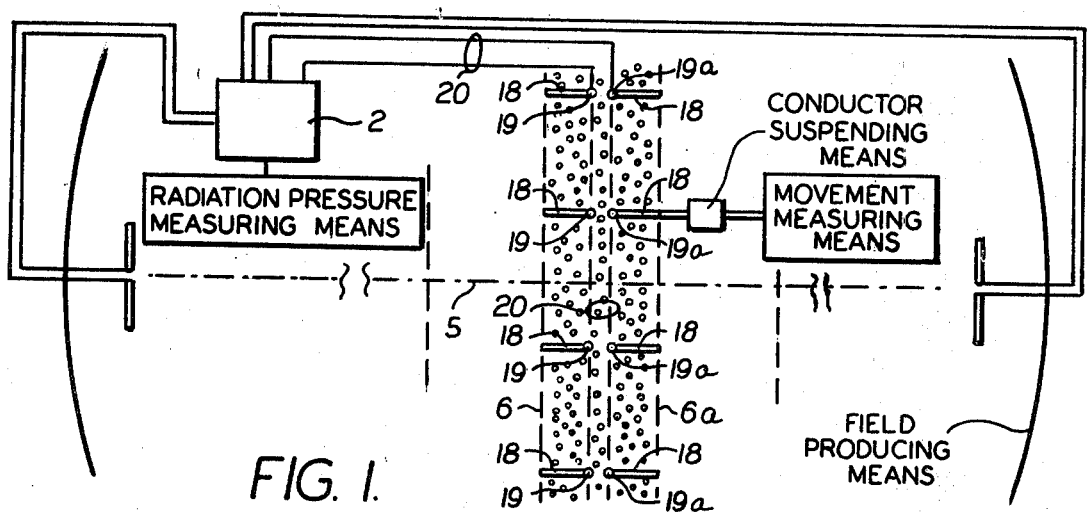
FIG. 1 shows one means by which one or more dipole antennas may be used to obtain drive thrust by interaction with a detached alternating electromagnetic field.

In the description which follows a detached portion of a standing alternating electromagnetic wave is utilized which is identical with that shown in FIG. 1 of my co-pending patent applications, Ser. Nos. 376,426 and 381,782, in which all magnetic vectors in the standing wave are polarized perpendicular to the printed page. Magnetic vectors of one polarity in the standing wave are designated by dots while those of opposite magnetic polarity are designated by small crosses. To those skilled in the art of magnetic radiation it will be clear that the corresponding electric vectors will occur at the same time and in the same space as the magnetic vectors but at 90° to the magnetic vectors, parallel with the printed page in planes perpendicular to the axis of wave propagation.

Referring to FIG. 1 in this application, a detached portion of a standing alternating electromagnetic wave is shown between two nodal planes 6 and 6a which are perpendicular to the printed page. The magnetic vectors are shown as dots and represent instantaneous magnetic vectors or lines of magnetic force perpendicular to the printed page in the same manner as described above in connection with my copending patent applications. The line of wave propagation 5 is perpendicular to nodal planes 6 and 6a. One or more dipoles 18 are located in anti-nodal regions throughout the standing wave perpendicular to nodal planes 6 and 6a and are of such length as to be resonant to the frequency of the standing wave. In this case, the total dipole length will be approximately equal to one-half the wavelength of the standing wave or the distance between nodal planes 6 and 6a. Terminals 19 and 19a of each dipole 18 are furnished power at the same frequency as the standing wave by a suitable high frequency alternating electric power source 2 which may also be used to produce the power needed to maintain the standing wave. Each dipole 18 is phased so that its instantaneous current is a maximum when the instantaneous magnetic field within the anti-nodal region between nodal planes 6 and 6a is also a maximum. The transmission line 20 between power source 2 and all dipole terminals 19 and 19a is shown schematically by dotted lines in order to simplify FIG. 1. Actually, the transmission lines 20 feeding each dipole 18 are located parallel with the magnetic vectors or perpendicular to the printed page until they leave the standing wave in order to avoid standing wave energy absorption due to their presence. Since the phasing of each dipole can be accomplished by utilizing approximate lengths of transmission line 20 between each dipole 18 and high frequency power source 2, or by other means well known to those skilled in the electronic art, the phasing means has not been shown or described in detail.

With the above arrangement of one or more dipoles energized so that their currents are in phase with the magnetic vectors of the standing wave it will be clear that a force will be exerted upon each dipole perpendicular to each dipole and perpendicular to the magnetic vectors. These forces will, therefore, be exerted in a direction perpendicular to the axis of standing wave propagation 5 and parallel with the printed page. Since the dipoles 18 are mechanically connected to the space vehicle the resultant of these forces will be exerted as a vehicle drive thrust. The resultant force will always be in one direction since both the dipole current direction and the magnetic polarity reverse each half cycle.

Figure 2:
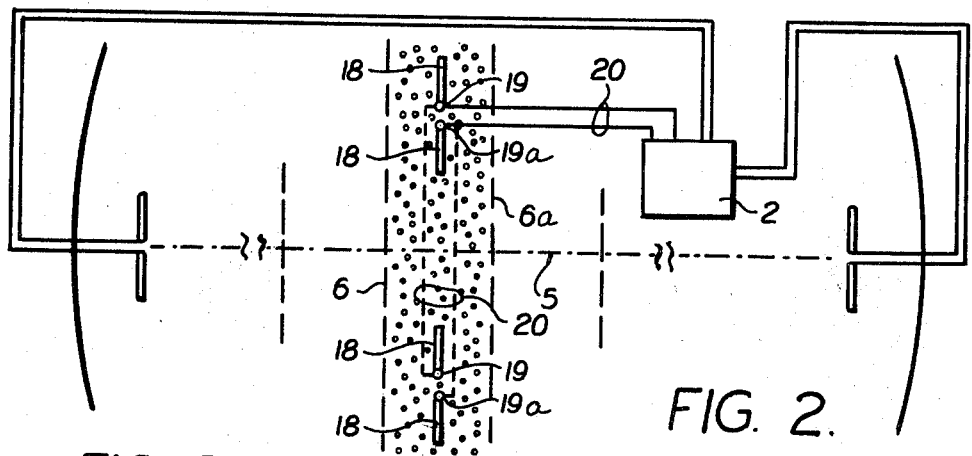
FIG. 2 shows another means by which one or more dipole antennas may be used to obtain drive thrust by interaction with a detached alternating electromagnetic field.

Referring to FIG. 2 in this application, one or more dipoles 18 are located throughout the standing wave in one or more anti-nodal regions parallel with nodal planes such as 6 and 6a and are of such length as to be resonant to the frequency of the standing wave, that is, approximately one-half wavelength in length. As in the case shown in FIG. 1, all dipole terminals 19 and 19a are supplied with electric power at the same frequency as the standing wave by transmission line 20 and power source 2. Each dipole 18 is phased so that its current is a maximum when the magnetic field within the anti-nodal region between nodal planes 6 and 6a is also a maximum. As in the arrangement shown in FIG. 1, the transmission lines 20 feeding each dipole 18 are perpendicular to the printed page until they leave the standing wave in order to avoid standing wave energy absorption. Phasing of each dipole can be accomplished by the same means as described above in connection with the system shown in FIG. 1.

With the orientation of dipoles shown in FIG. 2 a force will be exerted perpendicular to each dipole and perpendicular to the magnetic field vectors. These forces will therefore be exerted in a direction parallel with the axis of standing wave propagation 5 and parallel with the printed page. Since the dipoles are mechanically connected to the space vehicle the resultant of these forces will be exerted as a vehicle drive thrust. For the same reasons stated in connection with FIG. 1 the resultant force will always be in one direction even though the dipole current and standing wave field may be reversing direction at thousands of megacycles per second.

Figure 3:
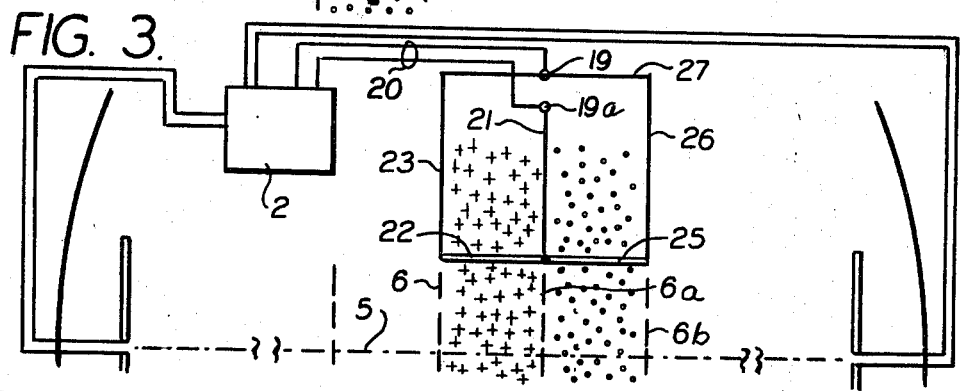
FIG. 3 shows one means by which one or more closed electrical circuits may be used to obtain drive thrust by interaction with a detached electromagnetic field.

FIG. 3 shows an arrangement of electrical current conductors which will also provide thrust. In this arrangement an alternating current of the standing wave frequency flows from terminal 19a to 19 via conductor 21 which feeds conductors 22, 23 and 24 and also conductors 25, 26 and 27. Conductors 24 and 27 return the current to terminal 19.

Since conductors 22 and 25 carry current in opposite directions in anti-nodal regions of opposite magnetic polarity a thrust will be imparted to conductors 22 and 25 in a direction perpendicular to standing wave propagation axis 5 and parallel with nodal planes 6, 6a and 6b. The thrust on conductors 22 and 25 will be in the same direction when the currents reverse their directions since the magnetic polarities will also change in each anti-nodal region of the standing wave. These thrusts will be exerted upon the space vehicle since conductors 22 and 25 are attached to the space vehicle. No resultant thrust will be exerted upon conductors 21, 23 and 26 since these conductors are located in nodal planes where the electromagnetic vectors are zero. To further insure minimum energy absorption by conductors 21, 23 and 26 these conductors may be located parallel with the magnetic vectors, if desired. No thrust can be exerted upon conductors 24 and 27 since they are outside the standing wave. As in the arrangements shown in FIGS. 1 and 2 high frequency power from a source 2 is fed to terminals 19 and 19a by a transmission line 20. As transmission line 20 may be located outside the standing wave it will not absorb standing wave energy.

Although only one two-mesh circuit is shown in FIG. 3 it will be clear to those skilled in the art that several such double circuit meshes may be utilized within the standing wave to augment the thrust produced. It will also be clear that one or more single circuit meshes might also be employed.

Figure 4:
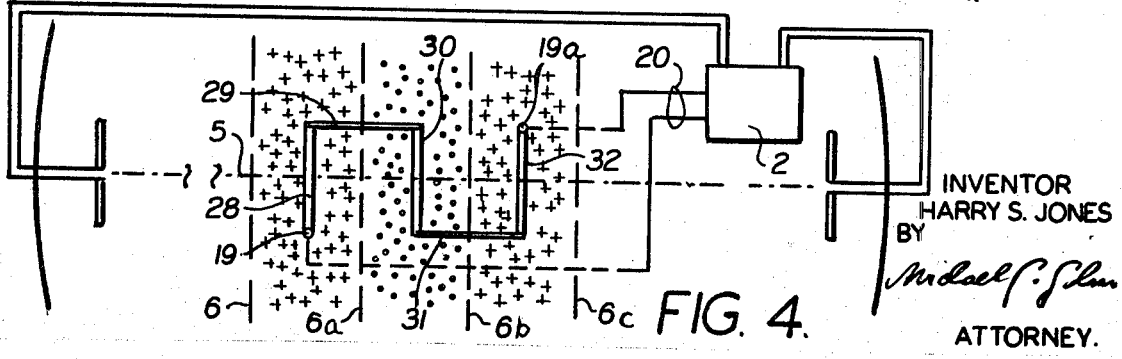
FIG. 4 shows another means by which one or more closed electrical circuits may be used to obtain drive thrust by interaction with a detached electromagnetic field.

FIG. 4 shows a different arrangement of conductors which will also provide thrust. In this arrangement an alternating current of the standing wave frequency flows from terminal 19 to 19a via conductors 28, 29, 30, 31 and 32.

Since conductors 28, 30, and 32 are located in anti-nodal regions of the standing wave perpendicular to the magnetic vectors and parallel with nodal planes 6, 6a, 6b and 6c they will receive a thrust which will be parallel with the direction of wave propagation 5. The thrusts upon conductors 28, 30, and 32 will all have the same direction since the current directions will reverse as the magnetic vectors in which they are located reverse. If conductors 29 and 31 are located outside the standing wave they will, of course, not receive a thrust. If conductors 29 and 31 should be located within the standing wave the thrusts exerted upon them will average zero and cancel each other, since the current flows equal distances through magnetic vectors of opposite polarity and of equal magnitude. If desired, conductors 29 and 31 may be located parallel with the magnetic vectors and bridged outside the standing wave. If conductors 28, 30 and 32 are extended outside the standing wave power from source 2 may be fed to terminals 19 and 19a via transmission line 20 outside the standing wave. In this case no problem of absorption of standing wave energy by transmission line 20 will exist. If conductors 28, 30 and 32 do not extend outside the standing wave high frequency power from source 2 may be fed to terminals 19 and 19a via a transmission line 20 having conductors located parallel with the magnetic vectors.

It will be clear to those skilled in the art that several such sequences of conductors may be utilized within the standing wave to augment the thrust produced. It will also be clear that the number of conductors corresponding to 28, 30 and 32 may vary from a single conductor 28 to a considerable number, depending upon the number of detached anti-nodal regions available within the standing wave.

The arrangements shown in FIGS. 1, 2, 3, and 4 serve to illustrate a variety of means by which a thrust force may be developed upon one or more current-carrying conductors by utilizing the detached field of a standing electromagnetic wave. Such a field is also referred to by physicists as the "far zone or radiation field" of an electromagnetic wave. While several simple physical structures have been selected for illustration in this patent application it will be clear to those skilled in the art that these structures may be modified or used in various other combinations to obtain similar results without departing from the basic principle of this invention which is the use of a detached alternating electromagnetic field to develop thrust upon a conductor carrying current of the same frequency. For example, in some cases it may be found desirable to utilize folded type dipoles in lieu of the simple dipoles shown in the figures. It may also be practical to utilize a relatively large number of conductors in the standing wave to obtain maximum thrust.

It will also be clear that the standing wave generating components, the standing wave, and the current carrying conductors might be housed within a vacuum-tight enclosure to eliminate the electrical discharges and power losses which might occur if the apparatus operated in an atmosphere at the high field strengths necessary to obtain high thrust values.

It will also be clear that power lost by radiation from the dipoles or other conductors employed may be minimized by utilizing one or more suitable reflectors outside the standing wave.

While in no way being bound by the following explanation of the instant device, it is considered that the mass equivalent to the energy of the detached wave function of the instant device is being propelled out of the vehicle as a result of the repulsion thereof by the action of the resident dipoles 18 upon the detached wave. Considered from this point of view, there is "mass" leaving the system and free body propulsion can proceed without apparent violation of Newton's laws of motion.

While the use of a standing wave is preferred and has been used in the above description for the purpose of simplifying the description, a nonstanding or moving wave could also be used in essentially the manner described provided the current phasing in the current-carrying conductors is adjusted so that when the non-standing wave field intensity is a maximum the conductor currents are also a maximum. However, due to the power radiated out of the system by a non-standing wave this method of operation will be less efficient than the use of a standing wave which may be maintained within a limited space with the expenditure of considerably less power.

This invention further envisions conventional apparatus for testing the thrust produced by the above-described device. Such testing apparatus is the device, but in addition, includes means to suspend the conductor in suitable position as described free of the housing or even without a formal housing. Such suspension means may be a thin wire over a knife edge support or something of similar construction. In addition to the suspension means, means for measuring the force exerted by the field on the conductor substantially perpendicular to the electromagnetic field direction of propagation and/or for measuring movement of the conductor when the field and the current are both in operation should be provided.

What is claimed is:

1. Testing device comprising means for producing an alternating electromagnetic field in a zone having an elongated axis, which field is physically detached from the field generating means; an elongated electrical conductor disposed in the zone adapted to receive said field spacially disposed in said zone in the plane of direction of propagation of said field; means for movably suspending said conductor in said zone; means for inducing electrical current to flow in said conductor; means for synchronizing the phasing of the current in said conductor to said field such that both said current and the magnetic portion of said electromagnetic field simultaneously maximize; means proximate to, but outside said zone and positioned substantially perpendicular to said axis for measuring the force exerted on said conductor; and means for measuring movement of said conductor relative to said field.

2. A testing device as claimed in claim 1, wherein said electromagnetic wave is a detached standing wave.

3. A testing device as claimed in claim 1, wherein said conductors are dipoles.

4. A testing device as claimed in claim 1, wherein said conductors are spatially disposed perpendicular to the nodal planes of said field.

5. A testing device as claimed in claim 1, wherein said conductors are spatially disposed parallel to the nodal planes of said field.

References Cited
UNITED STATES PATENTS

| | | |
|---|---|---|
| 2,522,998 | 9/1950 | Corson et al. |
| 3,052,088 | 9/1962 | Davis et al. _____ 60—202 |
| 3,263,102 | 7/1966 | Bahnson. |

RICHARD C. QUEISSER, Primary Examiner

J. W. MYRACLE, Assistant Examiner

U.S. Cl. X.R.
60—202; 313—153